Figure 1:
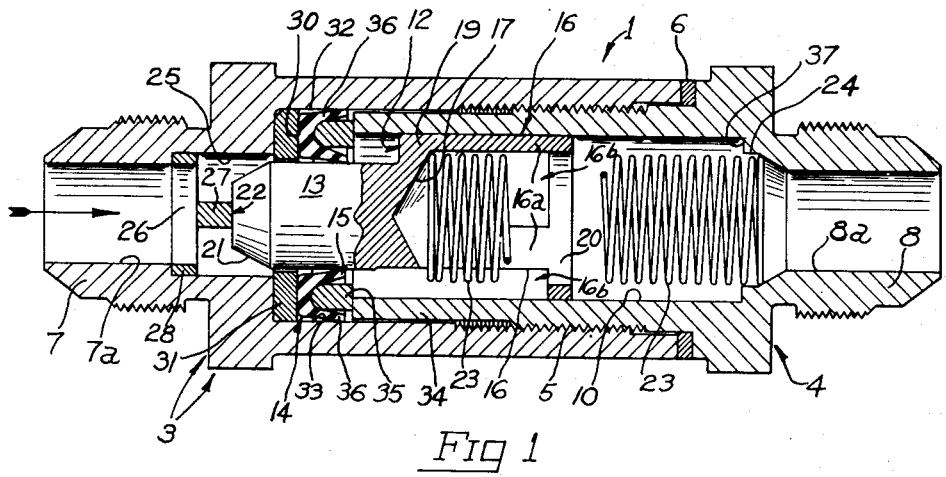

Sept. 29, 1953

C. R. SACCHINI 2,653,792

CHECK VALVE WITH PLUG MATING A FLANGED
NONMETALLIC SEALING ELEMENT

Filed Nov. 5, 1949

INVENTOR.
COLUMBUS R. SACCHINI

BY
ATTORNEY

Patented Sept. 29, 1953

2,653,792

UNITED STATES PATENT OFFICE 2,653,792

CHECK VALVE WITH PLUG MATING A FLANGED NONMETALLIC SEALING ELEMENT

Columbus R. Sacchini, Willoughby, Ohio, assignor to The Marquette Metal Products Company, Cleveland, Ohio, a corporation of Ohio Application November 5, 1949, Serial No. 125,676

1 Claim. (Cl. 251—122)

The invention relates to an improved check valve unit operable by fluid pressure to open position to permit flow in one direction through the valve and closing automatically upon attempted reverse flow or cessation of flow, thus indicating the general object.

Various specific objects include provision of a check valve unit wherein or whereby: any type of fluid (liquid or gas) can be successfully handled at practically any pressure; one sealing surface element is of elastic non-metallic material which is never subjected to destructive impact during the valve closing operation and is self-compensating for expected wear; opening pressure (required breakaway or cracking force) can be extremely low even in heavy duty design; no expensive surface finishing operation is required on either of the coacting sealing elements of the valve to insure positive checking action—i. e. such as required when a metal plug element and coacting metal seat are used; the unit is not subject to audible chatter or flutter; the unit can and preferably does employ as its elastic non-metallic sealing element a device known as a U-cup seal or packing (ring having a U-shaped section) which is purchasable as a standard part and in that event either the inner or outer lip or both can be used as the active checking and fluid passing element or elements; the unit is not subject to faulty operation in case the coacting sealing elements are somewhat out of alignment from any cause, and the unit can be manufactured at exceptionally low cost especially for light duty operation.

Figures 2, 3:
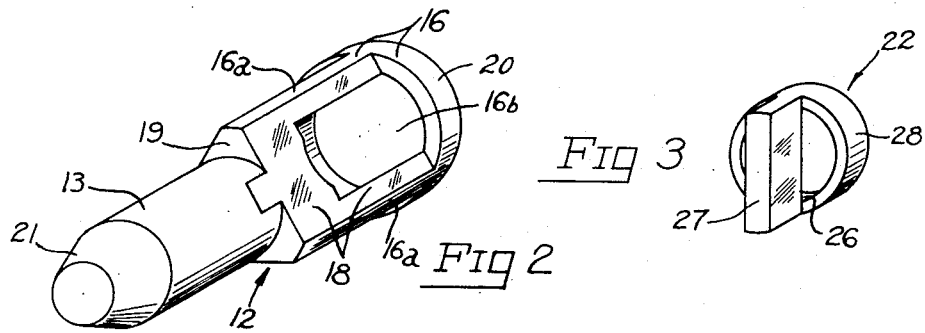

Other objects and features will become apparent from the following description of the illustrative forms shown in the drawing wherein:

Fig. 1 is a central sectional view of subject check valve in one form (heavy duty design). Figs. 2 and 3 are perspective views of the valve plug element according to Fig. 1 and the plunger stop thereof respectively.

The valve unit 1, as shown, comprises an elongated tubular metal body having complementary parts or sections 3 and 4 which may be connected by screw threads at 5 operable to clamp a relatively soft metal sealing gasket 6 between circular shoulders of the sections so that fluid entering either tubular end-fitting-support 7 or 8 must leave the body by way of the other if flow through the valve unit is to be permitted. Bore 7a is the inlet passage and bore 8a the outlet passage of the unit. For aircraft use and generally the body and all other metallic parts are preferably formed of corrosion resistant metal.

A main counterbore 10 of the body section 4 forming the principal part of the valve chamber supports a plunger 12 (more clearly shown in Fig. 2) for free axial movement. A generally cylindrical plug portion 13 of the plunger enters the U-cup seal 14 (described later) in sliding contact with its somewhat flexible inner lip or flange 15 to close the valve. The open position of the valve is not illustrated. The plug-guiding or enlarged diameter stem portion 16 of the plunger 12 is of adequately braced skeleton or spider form by being socketed at 17 and polyfaceted as at 18 so as to minimize contact friction with the body wall which defines the bore 10 and provide for free flow of fluid past the enlarged stem portion 16 in either direction axially through the body along said bore. The planes of the three illustrated faces 18 cut the end wall portion 19 and the adjacent outer body portion of the stem thereby providing circumferentially spaced parallel bars 16a partly defining the necessary flow passages 16b between them. In the open condition of the valve the cylindrical portion 13 of the plug defines with the bore 10 of the inner body member 4 a flow passage intermediate that provided by the valve inlet generally (bore 7a and the rest) and that provided by openings 16b. The bars 16a, remotely of the plug portion 13, are interconnected, thus mutually braced in position, by an integral ring portion 20 of the plunger 12 which ring is not mutilated by said faces 18. Thus the plunger is made of light weight but of adequate strength and performance capabilities by a few economical machining operations on round stock of appropriate diameter. The plunger could obviously be die-cast to approximately the shape shown at relatively low cost.

The plug portion 13 of the plunger 12 preferably has a bullet nosed or tapered and blunted leading end (taper indicated at 21) to assist the plug portion in slightly expanding the diameter of the lip or flange 15 of the U-cup seal 14 when it enters the seal. Even though the free inner edge of the lip is formed exactly the same diameter as the plug portion 13 it will ordinarily be contracted to a smaller diameter as attempted reverse flow occurs and before the plug portion enters the seal. The lip is usually formed undersize in relation to the diameter of plug portion 13 in order to insure initial or static fitting of the lip around the plug at negligible fluid pressure conditions within the valve.

The plunger 12 is lightly biased toward closing position against a suitably apertured stop member 22 (described later) by a low rate coil spring 23 partly received within the plunger socket 17 at one end and positioned at the other in a counterbore 24 of the body section 4. The bottoms of the socket 17 and counterbore 24 are conical which tend to keep the spring centered and out of peripheral contact with the plunger and body bore 10.

The plug 22 (see particularly Fig. 3) is contained in a counterbore 25 of body section 3 and is preferably formed from a disc of fairly tough metal, since the stop may have to resist considerable impact force in repeated valve closing operations, and must also be of skeleton construction to allow free fluid passage through the valve body. To that end the circular disc-form blank from which the stop is made has a flat ended bore 26 intersecting the face which lies adjacent the inlet 7a and the opposite side of the blank is cross-milled to meet the bore and provide a diametral bridge or bar 27 integrally connected at its ends with the ring 28 defining the bore 26. The bridge receives the impact of the flat or blunt end of the plunger 12 as the valve closes. Preferably the bore 26 is the same size as inlet bore 7a. The bridge 27 offers negligible obstruction to flow, particularly since it is fairly narrow and the bore 25 provides an enlargement of the effective inlet passage in the plane of the bridge transversely of the unit.

Referring further to the U-cup seal 14 the particular design of this is illustrative only and its composition is determined largely by intended use. It can be rubber or elastomer (i. e. synthetic) being preferably tough, wear resistant and practically incapable of permanent distortion out of formed shape. The U-cup seal preferably has a flat base 30 resting on a metal supporting ring or base 31 which extends radially beyond the inner and outer limits of the base of the seal. The seal 14 is snugly positioned and centered in an annular chamber 32 provided by the ring 31 and surrounding walls of the body including bore portion 33 of body section 3 and the smooth (i. e. non-threaded) end portion 34 of body section 4. The portion 34 supports a rigid back-up ring or retainer 35 shaped at one side to conform generally to the inner configuration of the U-cup seal at its base but clearing the inner lip 15 so that the latter is entirely free to expand and move away from the plug portion 13 of the plunger during opening of the valve. The back-up ring or retainer 35 as shown is also clear of the outer lip or flange 36 of the U-cup seal but in the instant design in which the lip 36 is intended to remain in contact with the body bore 33 at all times that clearance is unimportant.

The principal function performed by the rigid back-up ring or retainer 35 is to prevent movement of the U-cup seal in its annular chamber out of position normal to the plug portion 13 (i. e. tilting out of place) when the plug portion is withdrawn from contact with the seal. In designs wherein discharge of fluid is desirable past both sealing lips in the direction to open the valve (not illustrated) the seal 14 may be purposely permitted to move freely in its chamber back and forth axially of the unit. Thereby discharge capacity may sometimes be increased.

A further function performed by the back-up ring or retainer 35 is that of limiting the inward movement of the base of the U-cup seal under axial closing pressure and similarly limiting inward movement of the inner lip 15 by confining its flexure to the lip itself and a small portion only of the base. The second mentioned action helps to maintain the lip 15 centered with the plug portion 13 when the latter is withdrawn from contact with the seal during the valve opening operation.

It will be apparent from the above and the drawing that as fluid flows toward the valve chamber in the normal direction indicated by the arrow the plug portion 13 initially acts as a piston in breaking the seal, the lip 15 being simultaneously expanded by hydrostatic pressure action away from the plug, forming therewith an annular, restricted flow passage, so that the lip does not drag on the plug as the plunger moves the necessary distance to open position. Opening movement may be limited by a shoulder 37 of body section 4 which engages the ring 29 of the plunger if limiting is necessary due to excessive rate of flow. Usually the plug portion 13 withdraws from the seal 14 only the necessary distance to permit the required flow. Thereby the valve closes quickly on attempted reverse flow.

If the rate of flow through the valve on opening of it is comparatively low there may be insufficient pressure drop beyond the plug portion 13 to prevent the spring from repeatedly reseating the plug portion (taper 21) against the lip 15 of the U-cup seal, causing flutter. That is not apt to happen because the rate of the closing spring 23 is low due to the small cross section of its wire and the comparatively great length of the spring. However, if flutter does occur there is no percussive impact (chatter of metal parts on each other), hence no noise. Breakaway or cracking pressure force requirement is low because it takes negligible pressure to expand the lip 15 away from the plug portion 13, and thereafter the only resistance to opening movement is the small amount of possible friction between the enlarged part 16 of the plunger 12 and the guide bore 10. The clearance between portion 16 and the guide bore 10 is considerable, so that the plunger will always be entirely free to move axially, but is less than the clearance between the washer 31 and the plug portion 13, and thereby there is never any possibility of the plug portion dragging on the washer.

During the closing or checking movement full sealing occurs as soon as the plug taper 21 makes peripheral contact with the lip 15, for then inward hydrostatic pressure is applied all around the lip, normal thereto, to effect and maintain sealing against the plug surface. That occurs notwithstanding that there may be some initial eccentricity between the plug and seal lip; and maintenance of perfect sealing as the plug moves farther into the lip will be had notwithstanding that there may be fairly deep surface scratches on the plug portion 13 such as may occur through careless handling or finishing. Neither the plug portion 13 nor the contacting portion of the lip 15 has to be particularly smooth although smoothness of both is highly desirable. Obviously if the plug surface is not reasonably smooth there will be considerable wear on the lip of the U-cup seal as the valve closes repeatedly under high pressures.

During the initial impact of closing pressure on the exposed end face of the lip 15 (assuming fairly high fluid closing pressure) the lip is axially distorted to some extent and the inner base region of the U-cup is caused to contract toward the plug portion 21, meanwhile being forced extremely tightly against the washer 31. The reason for extending the washer 31 radially inwardly nearly into contact with the plug portion 13 (in the closed position of the valve) is primarily to avoid the possibility of extrusion of the U-cup seal material into the necessary annular clearance space between the plug portion 13 and the washer such as would cause destruction of the seal material or sticking of the plunger. If the hole in the washer 31 were to be enlarged for example to the size of the counterbore 25 which supports the stop 22 the base of the U-cup seal would eventually, after repeated closings under high pressure, be sharply cut by the edge defining the hole in the washer. That would occur if the washer 31 were to be omitted and the U-cup seal were to rest directly on the supporting shoulder for the washer in the body section 3. Such an arrangement would be impractical because the counterbore 25 cannot be reduced very much in diameter while serving as a support for an adequately strong base ring for the stop bar or bridge 27. (The bore 26 in the stop piece 22 should not be smaller than the inlet 7a because it would then offer considerable restriction to normal flow through the valve unit. The bridge 27 itself offers almost no restriction due to the effective enlargement of the inlet passage by counterbore 25 in the plane of the bridge.)

I claim:

In a check valve assembly for fluid lines, a body including two relatively telescoping outer and inner tubular body members screw threaded and sealed together and respectively having end portions adapted for detachable connection with sections of a fluid line, the outer body member having an axial inlet bore for the fluid and two counterbores the larger of which, in cooperation with an inner end portion of the inner body member defines a cylindrical, check valve seal assembly receiving space, three annular members constituting such seal assembly in said space and comprising a metal base seated in the bottom of the larger counterbore, a one piece flexible elastic seal element having circular flanges relatively diverging in the normal direction of flow through the inlet bore and a metal retainer for the seal element, the base and retainer having relatively opposed axial face portions approximately complementary to respective axially directed surface portions of the seal element, and in tight engagement therewith, the inner flange of the seal element projecting inwardly toward the flow axis with respect to inner-bore-defining surface portions of the annular base and retainer and spaced relative to the metal retainer to permit outward flexing of the flange, a plug having an axially apertured main portion slidably guided by the inner body member and having a cylindrical smooth, inner-seal-flange-engaging portion with a portion of reduced cross section therebeyond toward said inlet bore, the cylindrical portion being of smaller diameter than the main portion, thereby defining with the inner body an intermediate flow passage in communication through the axially apertured main portion with an outlet in the inner body member, the base and retainer members being radially spaced from the cylindrical portion so that upon outward flexing of the inner flange a restricted flow passage is defined with the cylindrical portion, a metal stop for engagement with said reduced cross sectional end of the plug and having an annular base in the smaller counterbore against an end-defining shoulder provided thereby and having a diametral rigid bridge portion located wholly between the base of the stop and said plug end for contact with the latter, resilient means in the valve body to bias the plug toward the stop, the plug engaging the stop and said flange sealingly engaging said cylindrical portion in the valve closed position and, upon sufficient fluid pressure to outwardly flex the said flange, fluid communication is established with the outlet through the restricted, intermediate and main portion passages and, upon increased fluid pressure, the cylindrical portion is withdrawn from engagement with the seal against the bias of the spring to permit direct fluid communication between the inlet and intermediate passage.

COLUMBUS R. SACCHINI.

References Cited in the file of this patent

UNITED STATES PATENTS

| Number | Name | Date |
|---|---|---|
| 684,099 | Richemond | Oct. 8, 1901 |
| 1,342,734 | Barthez | June 8, 1920 |
| 1,930,839 | Kater | Oct. 17, 1933 |
| 2,135,004 | Heidloff | Nov. 1, 1938 |
| 2,329,960 | Verhuel | Sept. 21, 1943 |
| 2,394,272 | Thiel | Feb. 5, 1946 |
| 2,490,511 | Courtot | Dec. 6, 1949 |
| 2,495,880 | Volpin | Jan. 31, 1950 |
| 2,509,656 | Tomoser | May 30, 1950 |

FOREIGN PATENTS

| Number | Country | Date |
|---|---|---|
| 1,570 | Great Britain | of 1861 |